(12) United States Patent
 Chandran (10) Patent No.: US 9,677,019 B2
(45) Date of Patent: Jun. 13, 2017

(54) SYSTEM AND METHOD FOR PROCESSING RAW GAS WITH IN-SITU CATALYST REGENERATION

(71) Applicant: ThermoChem Recovery International, Inc., Baltimore, MD (US)

(72) Inventor: Ravi Chandran, Ellicott City, MD (US)

(73) Assignee: ThermoChem Recovery International, Inc., Baltimore, MD (US)

(*) Notice: Subject to any disclaimer, the term of this patent is extended or adjusted under 35 U.S.C. 154(b) by 184 days.

(21) Appl. No.: 14/437,787

(22) PCT Filed: Oct. 30, 2013

(86) PCT No.: PCT/US2013/067448
§ 371 (c)(1),
(2) Date: Apr. 22, 2015

(87) PCT Pub. No.: WO2014/070857
PCT Pub. Date: May 8, 2014

(65) Prior Publication Data
US 2015/0275111 A1    Oct. 1, 2015

Related U.S. Application Data

(60) Provisional application No. 61/720,821, filed on Oct. 31, 2012.

(51) Int. Cl.
*B01J 7/00*       (2006.01)
*C10K 3/02*       (2006.01)
(Continued)

(52) U.S. Cl.
CPC ............ *C10K 3/023* (2013.01); *C01B 3/58* (2013.01); *C10G 11/10* (2013.01); *C10G 70/046* (2013.01);
(Continued)

(58) Field of Classification Search
CPC combination set(s) only.
See application file for complete search history.

(56) References Cited

U.S. PATENT DOCUMENTS 5,534,476 A     7/1996  Luoma et al.
6,186,658 B1 *  2/2001  Nishida ............... B01F 5/064
                                                          208/153

(Continued)

OTHER PUBLICATIONS

International Search Report dated Apr. 18, 2014 issued in PCT counterpart application (No. PCT/US2013/067448).
Written Opinion dated Apr. 18, 2014 issued in PCT counterpart application (No. PCT/US2013/067448).
(Continued)

*Primary Examiner* — Imran Akram
(74) *Attorney, Agent, or Firm* — Womble Carlyle (57) ABSTRACT

A system and method for improving the quality of a raw gas or raw syngas passes the raw gas or raw syngas past a catalytic element comprising catalyst with an optional sorbent. A downstream measurement of one or more parameters of the improved gas is fed back to a controller configured to regulate the regeneration of the catalyst and optional sorbent and, optionally, the flow rate of the regeneration fluid to the catalytic element. The system and method are particularly suitable for improving raw syngas generated from a carbonaceous material in a fixed bed or fluidized-bed or entrained-flow gasifier. One or more undesirable syngas constituents are subject to one or more of catalytic cracking, reforming, partial oxidation and/or decomposition to promote their conversion into desirable syngas constituents. At least one catalytic element is regenerated in situ, either periodically, continuously, or in a combination of these two modes.

21 Claims, 6 Drawing Sheets

(51) Int. Cl.
  *C10G 11/10* (2006.01)
  *C10G 70/04* (2006.01)
  *C01B 3/58* (2006.01)
  *C10J 3/48* (2006.01)
  *C10J 3/72* (2006.01)
  *C10J 3/84* (2006.01)
  *C10K 1/02* (2006.01)
  *C10K 1/26* (2006.01)
  *C10K 1/34* (2006.01)

(52) U.S. Cl.
  CPC .............. *C10J 3/482* (2013.01); *C10J 3/723* (2013.01); *C10J 3/84* (2013.01); *C10K 1/026* (2013.01); *C10K 1/26* (2013.01); *C10K 1/34* (2013.01); *C10K 3/02* (2013.01); *C01B 2203/0227* (2013.01); *C01B 2203/0261* (2013.01); *C01B 2203/0277* (2013.01); *C01B 2203/0425* (2013.01); *C01B 2203/0435* (2013.01); *C01B 2203/1676* (2013.01); *C10J 2200/09* (2013.01); *C10J 2300/0916* (2013.01); *C10J 2300/0976* (2013.01); *C10J 2300/1261* (2013.01); *C10J 2300/1618* (2013.01); *Y02P 20/584* (2015.11)

(56) References Cited

U.S. PATENT DOCUMENTS

| | | | |
|---|---|---|---|
| 6,261,990 | B1 | 7/2001 | Terada et al. |
| 6,753,354 | B2 | 6/2004 | Koveal et al. |
| 7,005,455 | B2 | 2/2006 | Cnossen et al. |
| 8,168,564 | B2 | 5/2012 | Pieterse et al. |
| 8,278,363 | B2 | 10/2012 | Holcombe |
| 8,348,605 | B2 * | 1/2013 | de Broqueville .......... B01J 2/16 415/121.2 |
| 2005/0164879 | A1 | 7/2005 | Chen |
| 2006/0101812 | A1 | 5/2006 | Havlena et al. |
| 2008/0245058 | A1 | 10/2008 | Boddy et al. |
| 2009/0326279 | A1 | 12/2009 | Tonkovich et al. |
| 2010/0040510 | A1 | 2/2010 | Randhava et al. |
| 2011/0059844 | A1 | 3/2011 | Bryden et al. |
| 2011/0118113 | A1 | 5/2011 | Miyoshi et al. |
| 2012/0181483 | A1 * | 7/2012 | Simmons ................ C01B 3/384 252/373 |
| 2012/0217440 | A1 * | 8/2012 | Tetzlaff ................. B01J 8/0055 252/373 |

OTHER PUBLICATIONS

International Preliminary Report on Patentability (IPRP) issued on Apr. 16, 2015 in PCT counterpart application (No. PCT/US2013/067448).

* cited by examiner

SYSTEM AND METHOD FOR PROCESSING RAW GAS WITH IN-SITU CATALYST REGENERATION

RELATED APPLICATIONS

This is a 35 USC 371 U.S. National Phase of International Application No. PCT/US2013/067448, filed 2013 Oct. 30 and published in English as WO 2014/070857A2 on 8 May 2014. The present application claims priority to U.S. Provisional Patent Application No. 61/720,821 filed Oct. 31, 2012. The contents of the aforementioned applications are incorporated by reference in their entirety.

FIELD OF INVENTION

This invention relates generally to catalytic upgrading reactions and in-situ catalyst regeneration; specifically to reactions involving hydrocarbons or organic compounds. More specifically, disclosed herein is a method for improving the quality of syngas generated from a carbonaceous material in a fixed bed or fluidized-bed or entrained-flow gasifier wherein one or more undesirable syngas constituents are subject to one or more of catalytic cracking, reforming, partial oxidation and decomposition to promote their conversion into desirable syngas constituents with in-situ regeneration of the catalyst periodically or continuously or in a combination of these two modes to maintain catalyst activity and selectivity.

BACKGROUND

The use of syngas from the gasification of carbonaceous feedstocks is of increasing interest for advanced energy generation and the production of alternative fuels and chemicals. Due to the interest in distributed power generation and liquid fuels production, hot syngas processing solutions have been developed and are gaining wide popularity.

The objective in gasification is to maximize the conversion of a carbonaceous feedstock into desirable syngas constituents (i.e., $H_2$ and CO). This requires conversion of hydrocarbons, volatile organic compounds (VOC), and condensable semi-volatile organic compounds (SVOC) generated during gasification into syngas. Several different approaches have been and are being developed to affect this such as catalyst particles, catalyst packing, catalyst monoliths and catalyst coated or impregnated particulate filters.

Many investigators have developed catalysts to convert hydrocarbons, VOC and SVOC in steam reforming, autothermal reforming and partial oxidation modes of reactor operation. The key performance targets are conversion, yield, and selectivity while maintaining performance with negligible or minimal loss of activity. Potential factors that can lead to catalyst deactivation or degradation are: attrition or decrepitation of the particle or catalyst layer, sintering, agglomeration, coke formation, and poisoning due to feedstock-derived syngas impurities ($H_2S$, COS, HCl, $NH_3$, HCN, organic sulfur, chlorine and/or nitrogen compounds, metal vapors, metal carbonyls, etc.).

Some recent reviews include:
Gerber, M. A., "Review of Novel Catalysts for Biomass Tar cracking and methane Reforming", Pacific Northwest National Laboratory Report PNNL-16950, October 2007.
Fang, H., Haibin, L., and Zengli, Z., "Advancements in Development of Chemical-Looping Combustion: A Review', Intl. J. Ch. E., Volume 2009 (2009), Article ID 710515.
Kolb, G., "Fuel Processing: for fuel cells", Technology & Engineering, 2008, 424 pages.
Yung, M. M., Jablonski, W. S., Magrini-Bair, K. A., "Review of Catalytic Conditioning of Biomass-derived Syngas", Energy & Fuels, 23, pp 1874-1887, 2009.
Van Beurden, P., "On the Catalytic Aspects of Steam-Methane Reforming—A Literature Survey", ECN-I-04-003 Report, December 2004.

Advanced catalysts which can operate under the adverse conditions of gasification are described in the following U.S. published patents and patent applications, whose contents are incorporated herein by reference: U.S. Pat. No. 7,329,691, U.S. Pat. No. 7,824,574B2, U.S. Pat. No. 8,105,973, US20060127656, US20070116639A1, US20080041766A1, US20090209412A1 and US20120046163.

US20060127656 to Gallo et al. discloses a novel catalytic membrane reactor for carrying out electrochemical reactions in a solid state. It comprises an organized assembly based on superposed layers of materials which have a perovskite-type crystallographic structure. This reactor is intended for the production of syngas by the oxidation of natural gas.

US20070116639A1 to Lomax et al. teaches the preparation of a catalyst that can be used for the production of hydrogen from hydrocarbon fuels in steam reforming processes; the catalyst contains an active noble metal, (e.g., at least one of Ir, Pt and Pd), on a catalyst support including at least one of monoclinic zirconia and an alkaline-earth metal hexaaluminate to exhibit improved activity, stability in both air and reducing atmospheres, and sulfur tolerance. Preferred reactor type is not indicated but the application seems to suggest a packed bed or fixed bed reactor.

US20080041766A1 to Giroux et al. teaches a method of reforming a sulfur containing hydrocarbon which involves contacting the sulfur containing hydrocarbon with a sulfur tolerant catalyst containing a non-sulfating carrier and one or more of a sulfur tolerant precious metal and non-precious metal compounds so that the sulfur tolerant catalyst adsorbs at least a portion of sulfur in the sulfur containing hydrocarbon and a low sulfur reformate is collected, and contacting the sulfur tolerant catalyst with an oxygen containing gas to convert at least a portion of adsorbed sulfur to a sulfur oxide that is desorbed from the sulfur tolerant catalyst. This invention is intended to be carried out in a simple reactor or a swing reactor but not a fluidized bed.

U.S. Pat. No. 7,824,574B2 to White et al. teaches a process for cyclic catalytic upgrading of chemical species using metal oxide materials. It includes two reactors, one for reduction and another for oxidation and the catalyst circulating between the two reactors.

US20090209412A1 to Parent et al. teaches a method of preparing a steam reforming catalyst characterized by improved resistance to attrition loss when used for cracking, reforming, water gas shift and gasification reactions on feedstock in a fluidized bed reactor. This reference discloses a preparation method comprising: fabricating the ceramic support particle, coating a ceramic support by adding an aqueous solution of a precursor salt of a metal selected from the group consisting of Ni, Pt, Pd, Ru, Rh, Cr, Co, Mn, Mg, K, La and Fe and mixtures thereof to the ceramic support and calcining the coated ceramic in air to convert the metal salts to metal oxides. This is specifically intended for fluid bed applications but is made in the form of spherical particles ranging in size from 100 to 1,000 microns by agglomerating catalyst support material. Typically the unfired agglomerates are composed of catalyst support particles with an average size in the range of 0.3 to 10 microns, preferably in the range of 0.9 to 5 microns.

U.S. Pat. No. 8,105,973 to Basile et al. discloses a supported catalyst for producing $H_2$ and/or CO from low molecular weight hydrocarbons. It employs the "form memory" concept to increase the interaction between the support and the active phase and thereby improve the stability of the resulting catalyst at high temperature.

US20120046163 to Ifrah et al. discloses a catalyst of the perovskite formula $LaMO_3$, where M is at least one element selected from among iron, aluminum or manganese, in the form of particles dispersed on an alumina or aluminum oxyhydroxide substrate, wherein after calcination at 700 deg. C. for 4 h, the perovskite is in the form of a pure crystallographic phase, and in that the size of the perovskite particles did not exceed 15 nm.

One issue in using catalyst particles in a fluidized or entrained bed mode is attrition or decrepitation of the particle or catalyst layer and the need for make-up and the collection and disposal of the spent catalyst fines. In the case of catalyst packing, monoliths and catalyst particles employed in a fixed or packed bed mode, fouling or plugging by fine particles carried over in the syngas stream from the gasifier could adversely impact operation and performance. Catalyst deactivation or degradation due to poisoning by contaminants in the syngas stream such as sulfur compounds, coke formation, sintering, metal vapor deposition and agglomeration are common to both modes of operation. This requires catalyst regeneration via either continuous particle circulation through an external reactor or cyclic batch mode operation of two parallel reactors, one online for syngas treatment and the other in regeneration with its off-gas requiring further treatment. These tend to add complexity to equipment and operation and significantly increase the cost of syngas processing.

High temperature raw gas desulfurization has been carried out successfully by Li and Flytzani-Stephanapoulos using Cu—Cr—O and Cu—Ce—O oxides as regenerable sorbents. {Li, Z. and Flytzani-Stephanapoulos, M., "Cu—Cr—O and Cu—Ce—O Regenerable Oxide Sorbents for Hot Gas Desulfurization, Ind. Eng. Chem. Res., 36, pp 187-196, 1997}.

An alternate method of syngas cleanup and conditioning involves separation of particulate laden syngas through a filter, albeit a sintered porous metal or ceramic filter element, which may or may not have catalytic properties (see U.S. Pat. No. 8,007,688, and U.S. Pat. No. 6,077,490, and U.S. Pub. Pat. App. 2011/0058990 A1). Catalytic material may be coated, disposed, or impregnated into the candle filter element surface usually by sol gel or incipient wetness methods. An example is the high temperature removal of particulates and undesirable syngas constituents from biomass gasification syngas by use of catalytic candle filters {Ma et. al., *Powder Technology*, 180, 1-2, (2008)}. Methods have also been described to reduce levels of particulate and SVOC or VOC levels through filtration of the syngas through ceramic catalytic candle filters {Engelen et. al., *Chem. Eng. Sci.*, 58, 3-6, (2003)}.

Three major drawbacks of the hot gas filtration method are: (i) the need to maintain low raw syngas flow or face velocity through the filter elements to avoid excessive pressure drop and achieve satisfactory particulate capture which makes the filter unit large and very expensive and impractical for gasifiers operating at low to moderate pressure (<75 psig); (ii) the propensity of the filter's pores and interstices to become clogged with particulate matter, either by carbon deposition, or SVOC condensation (this in turn affects the overall up-time, efficiency and ability of the catalyst to reduce levels of hydrocarbons, VOC, SVOC or other contaminants on a continuous basis); and, (iii) potential for catalyst deactivation due to poisoning by raw syngas contaminants or coking with a loss of performance with time. As such, there is a need for a more robust and economical method to improve raw syngas quality.

SUMMARY

The aforementioned shortcomings can be overcome by utilizing catalytic elements with in-situ regeneration. This can improve raw gas quality and allow for particulate removal and contaminant cleanup to be accomplished downstream by a simple and traditional approach encompassing water quench or wet scrubbing and liquid phase filtration. Similarly, in-situ regeneration can help maintain catalyst activity and selectivity and performance in other processes or applications involving catalytic reactions.

DETAILED DESCRIPTION

Before the disclosed process is described, it is to be understood that the aspects described herein are not limited to specific embodiments, apparatus, or configuration, and as such can, of course, vary. It is also to be understood that the terminology used herein is for the purpose of describing particular aspects only and, unless specifically defined herein, is not intended to be limiting. All documents cited are in relevant part, incorporated herein by reference; the citation of any document is not to be construed as an admission that it is prior art with respect to the present invention.

In this specification and in the claims that follow, reference will be made to a number of terms that shall be defined to have the following meanings:

As used herein the term "raw gas" refers to a gas or a vapor with multiple constituents.

As used herein "improved gas" refers to raw gas that has contacted at least one catalytic element which promotes at least one gas or vapor constituent to be cracked or reformed or partially oxidized or decomposed or in combination thereof.

As used herein the term "raw syngas" refers to a gaseous mixture containing carbon monoxide (CO), hydrogen ($H_2$), and other vapors/gases, also including carbon particulate matter, if any and usually produced when a carbonaceous material reacts with steam ($H_2O$), carbon dioxide ($CO_2$) and/or oxygen ($O_2$).

As used herein the term "desirable syngas constituents" refer to hydrogen ($H_2$) and carbon monoxide (CO).

As used herein the term "undesirable syngas constituents" refer to any constituents present in syngas other than hydrogen ($H_2$) and carbon monoxide (CO).

As used herein "improved syngas" refers to raw syngas that has contacted at least one catalytic element which promotes at least one undesirable syngas constituent to be cracked or reformed or partially oxidized or decomposed or in combination thereof into at least one desirable syngas constituent.

As used herein the term "catalytic element" refers to a metal or ceramic structure having an external surface that accommodates a catalyst and an optional sorbent, porous walls, and one or more internal channels suitable for delivery of a regeneration fluid to the catalyst. This catalytic element strives to promote catalytic and optional sorptive reactions in the vicinity of the element's exterior wall to generate improved gas or improved syngas. A catalytic element as described in the preferred embodiment is also connected to a regeneration fluid supply that can carry a quantity of fluid through the inner cavity so that it may diffuse through the element's porous wall as to flow into an environment external to the inner cavity as to restore catalyst and optional sorbent activity. The regeneration fluid may be an oxidant such as oxygen, steam, carbon dioxide to oxidize carbon in case of coking, oxidize sulfur in case of sulfidation, etc.

The disclosed process can be configured by the formulator to meet the desired need. The disclosed process provides several unmet advantages to the quality improvement of syngas. The higher the quality of the syngas produced, that is, the improvement of elevating the concentration of desirable syngas constituents, coupled with reduction in the concentration of undesired syngas constituents, results in improved product yields in downstream processes. For example, Fischer-Tropsch processes convert only desirable syngas constituents into liquid fuels, so the presence of undesired syngas constituents reduces the partial pressure of reactants and results in less than desirable liquid yield and essentially wasted capital and operational expenditures. Furthermore, wet scrubbing unit operational syngas cleaning techniques have been employed in the past to promote condensation removal of SVOC from syngas based upon dew point. Improvements associated with the present inventive method either eliminate or minimize the need for complex wet scrubbing SVOC removal, ammonia scrubbing and recovery unit operations and thus resulting in capital and operating cost savings.

The detailed description of the system and process illustrated in FIG. 1 will now be described. It should be understood that each Figure is being provided for exemplary purposes only and is not intended as limiting any of the features and aspects of the present invention. For example, none of the streams depicted in any Figure should be interpreted as being necessary or critical to the present invention. Further, many of the features and aspects illustrated and described in any Figure may be used in other alternative embodiments of the present invention.

Figure 1:
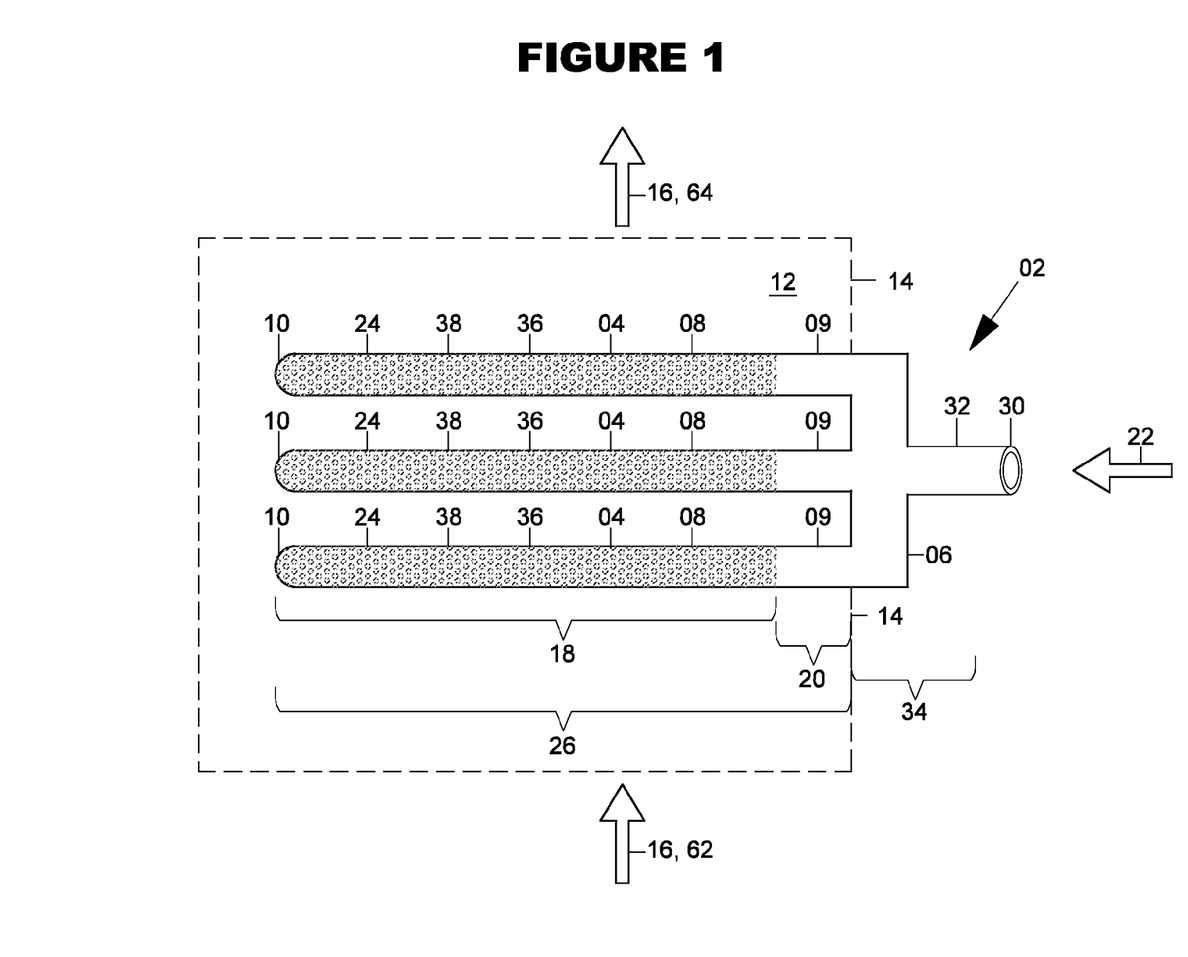
FIG. 1 shows a first embodiment of the catalytic element.
Figure 2:
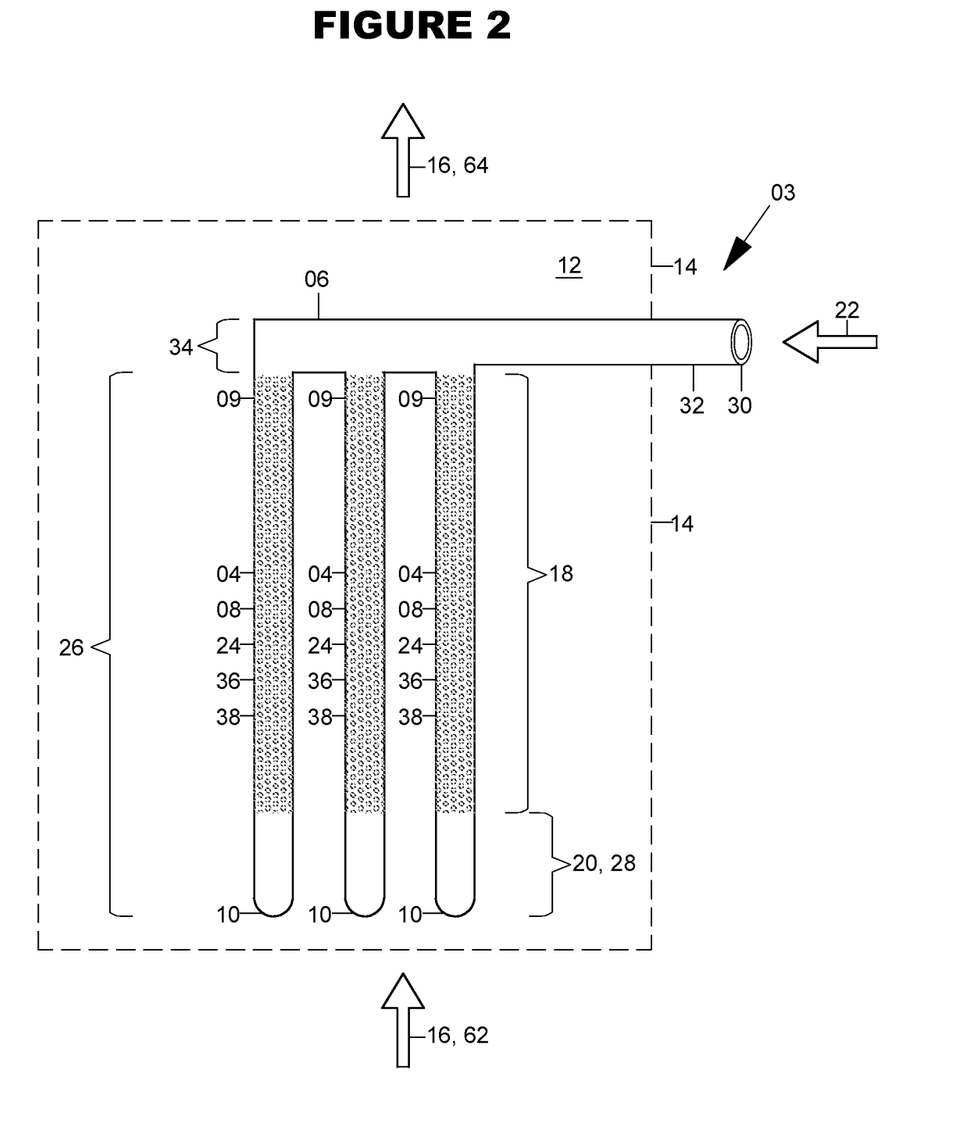
FIG. 2 shows a second embodiment of the catalytic element.

Embodiments of the catalytic element assembly (02, 03) are shown in FIGS. 1 and 2. In the embodiments of FIGS. 1 and 2, the catalytic element assembly (02, 03) is seen to include a plurality of catalytic elements (04) connected to a catalytic element manifold (06).

Each catalytic element (04) is preferentially in the form of an elongated hollow tube (08) having a first end (09) and terminating at a closed, second end (10).

The elongated hollow tube (08) may extend transverse (e.g., perpendicular) to the direction of the syngas flow path (12) inside the gasifier and so is oriented horizontally relative to the gasifier's vertical axis. In some embodiments, each catalytic element (04) may be located within the dense bed fluidization zone of a gasifier. The catalytic element manifold (06) may be located in a bounding region external to the gasifier (14), as shown in FIG. 1.

Alternatively, the elongated hollow tube (08) may extend parallel to the syngas flow path (12), as shown in the catalytic element assembly (03) of FIG. 2.

In FIG. 1, the catalytic elements (04) of the catalytic element assembly (02) are perpendicular to the predominant direction of syngas flow (16) while in FIG. 2, the catalytic elements (04) are oriented parallel to the predominant direction of syngas flow (16). It is to be noted that although FIG. 1 and FIG. 2 depict horizontal (02) and vertical (03) oriented catalytic element assemblies, respectively, assemblies having slanted orientations between the horizontal and vertical orientation may also be employed.

Furthermore, it is to be noted that FIG. 1 and FIG. 2 depict two dimensional views of catalytic element assemblies (02, 03). However, in practice the catalytic elements (04) may be arranged in a three dimensional manner in which staggered rows of catalytic elements (04) all extend in a common direction. The catalytic element assemblies (02, 03) may have unitary one-piece construction or may, instead, comprise individual catalytic elements (04) which are affixed to a catalytic element manifold (06) having a pattern of openings, each opening designed to accept one catalytic element (04), somewhat analogous to the layout of heat exchanger tubesheets used in heat transfer applications.

Undesirable syngas constituents within the syngas may be cracked, reformed, partially oxidized, and/or decomposed by the catalyst (38) impregnated within the pores of the catalytic element's (04) porous portion (18) which accommodates catalyst and optional sorbent.

Each catalytic element (04) includes a porous portion (18) and a non-porous portion (20). The porous portion (18) is configured to release regeneration fluid (22) into its active catalyst and optional sorbent surface (24), preferably via a diffusion mechanism. In some embodiments, the porous portion (18) may be less than the entire length of the catalytic element (26). In some embodiments, the porous portion (18) may be equal to the entire length of the catalytic element (26).

In the catalytic element assembly (02) shown in FIG. 1, the non-porous portion (20) is proximate the first end (09) of the catalytic element (04) and thus is located proximate to the manifold (06). This facilitates integration of the catalytic element assembly (02) with refractory-lined vessels.

In the catalytic element assembly (03) shown in FIG. 2, the non-porous portion (20) is proximate the closed second end (10). This non-porous portion (20) substantially coincides with a catalyst-free leading edge portion (28) and allows the syngas flow regime to develop preferably into a turbulent flow regime when contact of the syngas occurs with the porous portion (18) of the element.

The catalytic element manifold (06) is configured to receive a regeneration fluid (22) via the regeneration fluid inlet port (30). The external walls (32) of the manifold portion (34) are made of a vapor/gas impermeable material, such as metal, and allow the regeneration fluid (22) to enter each catalytic element (04). The entire catalytic element assembly (02, 03) may be pressurized with regeneration fluid (22) to achieve a desirable rate of release of the regeneration fluid (22) through the porous portion (18). One or more valves 80a, 80b (See FIGS. 4 & 5) may be used to control flow of the regeneration fluid (22) into the assembly (02, 03).

The regeneration fluid (22) flow settings may be either continuous or periodic or a combination of the two. The regeneration fluid flow rate will be a small fraction of the syngas flow rate, typically less than 15% and more preferably less than 7.5% by mass.

Each catalytic element exterior wall (36) is preferably comprised of a high temperature chemical resistant and mechanically and structurally stable porous material layered with a catalyst and an optional sorbent (38). In one embodiment, each catalytic element (04) is made of a porous composite tube formed from support materials such as monoclinic zirconia, yttria stabilized zirconia (YSZ), gadolinium-doped zirconia (Gd—Z) and alkaline-earth metal hexa-aluminate (MeO.6Al$_2$O$_3$, where Me is an alkaline-earth metal such as Ca, Ba and Sr) and coated with one or more catalyst metals selected from the group consisting of Rh, Pt, Ir, Pd and Re and, optionally, one or more sorbents selected from the group comprising copper oxide, Cu—Cr—O oxides, W and Mo.

The porous ceramic support tube is preferably formed as per one of the methods taught by Lomax et al. in US20070116639A1. Alternatively, the porous support may be formed by extrusion or by isostatic pressing. Preparation of this catalytic element embodiment will involve fabricating the porous ceramic support tube, coating the ceramic support tube by the incipient wetness method or sol-gel method or dip coating or spray coating or adding an aqueous solution of a precursor salt of a metal selected from the group consisting of Rh, Pt, Ir, Pd and Re and mixtures thereof and optional sorbent from the group comprising copper oxide, Cu—Cr—O oxides, W and Mo to the ceramic support and either thermally treating in a steam environment or reducing environment or calcining the coated ceramic tube in air/enriched air/oxygen containing mixture to convert the metal salts to metal oxides. Any of the various methods known in the art, such as deposition, precipitation, wash coating or impregnation may be used to coat the ceramic support tube with the catalyst and optional sorbent metals.

The support may be made porous by adding a pore-forming agent or binder to the liquid suspension of the ceramic material. The term pore-forming agent denotes an organic compound of controlled size, shape and controlled morphology capable of degrading or volatilizing entirely by a low-to-medium temperature heat treatment. The final porosity is controlled by choosing the shape, size and content of the pore former introduced into the ceramic material liquid suspension. One or more pore-forming agents may be added to the catalyst and the optional sorbent as well to render the catalyst and the optional sorbent layer porous.

In another embodiment, if the raw gas or raw syngas does not have contaminants or has been pre-treated for contaminants, the catalytic element (04) may be made of a porous composite tube formed from support materials such as ceria, alumina, zirconia, yttria, lanthanum, magnesium aluminate, promoted alumina, silica, titania, etc. and coated with one or more catalyst metals selected from Ni, Ru, etc.

In the above two embodiments, the "form memory" concept mentioned in U.S. Pat. No. 8,105,973 can be utilized to increase the interaction between the support and the active phase in order to improve the stability of the resulting product at high temperature. This concept involves the use of one raw material (A'), which accounts for one or several chemical elements (for example E), which is still present in the final product after synthesis. This raw material is attacked by chemical reactions (solid-liquid and/or solid-gas and/or solid-solid reactions) with precursors (B', D' for example), which must also be present in the final product. The final product is a new material (EB'D' for example), which is supported on the initial raw material (A'). This is to ensure good bonding or tie between the support and the catalyst/sorbent layer.

In yet another embodiment, the catalytic element (04) may be a porous tube of high temperature metal (either powder or fiber media) coated with 2 layers, the first layer formed from support materials such as monoclinic zirconia, YSZ, Gd—Z, alkaline-earth metal hexa-aluminate and the second or top layer comprising one or more metals selected from the group consisting of Rh, Pt, Ir, Pd, Re, copper oxide, Cu—Cr—O oxides, W and Mo. Pore-forming agents may be added as necessary to make both layers porous. Again, any of the various methods known in the art, such as deposition, dip coating, wash coating, spray coating, incipient wetness, sol-gel, precipitation or impregnation followed by partial or full thermal treatment may be used to coat the high temperature metal tube first with the ceramic coating and then the metal catalyst coating. The high temperature metal cited above may be a nickel-chromium-iron-molybdenum alloy, such as HASTEALLOY X™, available from Haynes International, Inc and described at http://www.haynesintl.com/HASTELLOYXAlloy/HastelloyXAlloyPF.htm, retrieved Oct. 30, 2012. It is understood that nickel-chromium-iron-molybdenum alloy may include other elements, such a Co, W, C, Mn, Si and B, in lesser amounts In yet another embodiment, if the raw gas or raw syngas does not have contaminants or has been pre-treated for contaminants, the catalytic element (04) may be a porous tube of high temperature metal (either powder or fiber media) coated with 2 layers, the first layer formed from support materials such as ceria, alumina, zirconia, yttria, lanthanum, magnesium aluminate, promoted alumina, silica, titania, etc. and the second or top layer comprising one or more metals selected from the group consisting of Ni, Ru, etc. Pore-forming agents may be added as necessary to make both layers porous. Again, any of the various methods known in the art, such as deposition, dip coating, wash coating, spray coating, incipient wetness, sol-gel, precipitation or impregnation followed by partial or full thermal treatment may be used to coat the high temperature metal tube first with the ceramic coating and then the metal catalyst coating. The high temperature metal cited above may be HASTELLOY X™.

In the embodiments cited above, perovskites such as ADO$_3$ may be used as catalyst and optional sorbent combination wherein A may correspond to one or more of La, Zr, Y, Mg, Gd, Sr and Ti and D may include one or more of copper oxide, Cu—Cr—O, Fe, Co, W, Mo, Ir, Pt, Pd, Rh and Re. If the raw gas or syngas does not have contaminants or has been pre-treated for contaminants, "A" may include one or more of La, Sr, Ca, Mg, Si, Ce, Zr, Ti, Ba, etc. and D may include Ni, Ru, Fe, Co, Al, Mn, Rh, Cu, etc. Again, one or more pore-forming agents may be added to the catalyst and the optional sorbent as well to render the catalyst and the optional sorbent layer porous.

In the case of a supported perovskite, it is important for the perovskite to be dispersed as finely as possible over the support, that is to say that it is provided in the form of fine particles, of nanometric sizes, on the support. In addition, as the catalysts are often exposed to high temperatures, it is also advisable for the finely divided state of the perovskite to be maintained even at these temperatures. In other words, sintering of the perovskite particles should not take place. It is desired that the perovskite be both in the finely dispersed form and in the pure crystallographic form.

The pores of the catalytic element's (04) porous portion (18) will have an average pore opening diameter smaller than 10 micrometers, and more preferably have an average pore diameter smaller than 2 micrometers.

The catalytic element (04) typically is likely to have a tubular geometry but may have other shapes and cross-sections such as oval, air foil, droplet, finned and fluted to increase surface area to volume ratio. Other geometries and embodiments are envisioned such as a wire mesh with small bore wires criss-crossed to provide high surface area contact with raw gas, spider web pattern, monolith, microlith, etc. It is understood, however, that each of these shapes, geometries and embodiments will include one or more internal channels suitable for delivery of regeneration fluid and porous and catalytic surfaces.

The operating temperature in the region of the catalytic element's (04) catalytic porous portion (18) should range between 200 and 1,100 deg. C. and more particularly between 800 and 900 deg. C. If the element is a cylindrical tube, the diameter is likely to range between 0.5 and 4 inches (12.5 to 100 mm) and more particularly between 1 and 2 inches (25 and 50 mm).

The catalyst contains a sufficient amount of precious metal with optional sorbent or perovskite to effect catalytic reaction.

In one embodiment, the catalyst contains about 0.01% by weight or more and about 20% by weight or less of precious metal with optional sorbent or perovskite and about 80% by weight or more and about 99.99% by weight or less of support element. In another embodiment, the catalyst with optional sorbent or perovskite contains about 0.25% by weight or more and about 30% by weight or less of precious metal with optional sorbent or perovskite and about 70% by weight or more and about 99.75% by weight or less of support element.

The support has a relatively high surface area to both disperse the precious metal or perovskite and optional sorbent. In one embodiment, the surface area of the support is about 10 m$^2$/g or more and about 500 m$^2$/g or less. In another embodiment, the surface area of the support is about 50 m$^2$/g or more and about 250 m$^2$/g or less.

To ensure that suitable amounts of raw gas come into contact with the catalyst, optional sorbent and/or perovskite, the catalytic elements (04) should occupy a good portion of the volume of the freeboard region within the vessel (44), and/or a good portion of the footprint of the catalytic elements (04) when projected onto the cross-section of the freeboard region or other passage where the catalytic elements (04) are present. For example, the catalytic elements (04) may need to occupy 10 to 60% of the volume of the freeboard region and/or the footprint of the catalytic elements (04) should occupy 50-95% of the cross-section of the freeboard region or other region where the catalytic elements (04) are present.

If any sulfur is present while catalytic cracking, reforming, partial oxidation and/or decomposition of one or more undesirable syngas constituents are taking place, there is potential for the catalyst and optional sorbent (38) to undergo a gradual deactivation by the mechanism of reversible sulfur poisoning. For example, if iridium is used as the catalyst and copper oxide as the sorbent, sulfur from the syngas may slowly adsorb onto the catalyst and sorbent (38) turning the iridium into $Ir_2S_3$ and the copper oxide into $Cu_2S$, and thus impeding its ability to catalytically convert undesirable syngas constituents into desirable syngas constituents. Further, carbon deposition may also occur on exterior surface of the catalytic element's (04) porous portion (18) thus impeding the ability of the undesirable syngas constituents, or any sulfur containing compound, to physically contact the catalyst and optional sorbent (38). Therefore, pore blocking by carbon deposition along with catalyst deactivation by sulfur adsorption are the potential mechanisms for a decrease in catalyst efficiency. To remedy this deactivation phenomena, it is arranged to inject regeneration fluid (22) through the catalytic element's (04) porous portion (18), on a continuous or periodic basis or in a combination mode. The regeneration fluid (22) is preferably comprised of an oxidant, such as oxygen, steam, air or carbon dioxide or a mixture thereof. Continuously or periodically disturbing the catalytic element exterior wall (36) has several benefits: (1) the hydrogen within the steam may act to hydrogenate the adsorbed sulfur into hydrogen sulfide or the oxygen in the oxidant will react with the adsorbed sulfur to form sulfur oxide thus acting as a continuous desorption mechanism to keep the catalyst surface active; (2) the oxidant oxidizes the sulfur in the $Cu_2S$ to form sulfur oxide and regenerate the sorbent into either copper oxide or copper and thereby activate it for sulfur containment; (3) the oxidant partially oxidizes any carbon deposited and prevents accumulation of carbon deposits; (4) the oxidant boosts the syngas temperature locally due to exothermic reaction heat release and in turn enhances the cracking and reforming reaction rates and the effectiveness of the catalyst in converting undesirable syngas constituents; and (5) the outward flow of fluid prevents fine particles, if any present in the syngas from depositing onto the catalyst and optional sorbent element and therefore aids in maintaining catalytic and sorbent activity. The sorbent herein acts as a preferential sulfur trap and aids in reducing the potential for sulfur poisoning of the catalyst.

The pressure within the catalytic element assembly (02, 03) may be maintained equal to or somewhat higher than that outside in the syngas flow. The flow of the regeneration fluid (22) through the catalytic element's (04) porous portion (18) can be controlled/regulated to address both the contamination levels of sulfur, carbon and fines on the catalytic element exterior wall (36) and the catalyst activity and selectivity.

Figure 3:
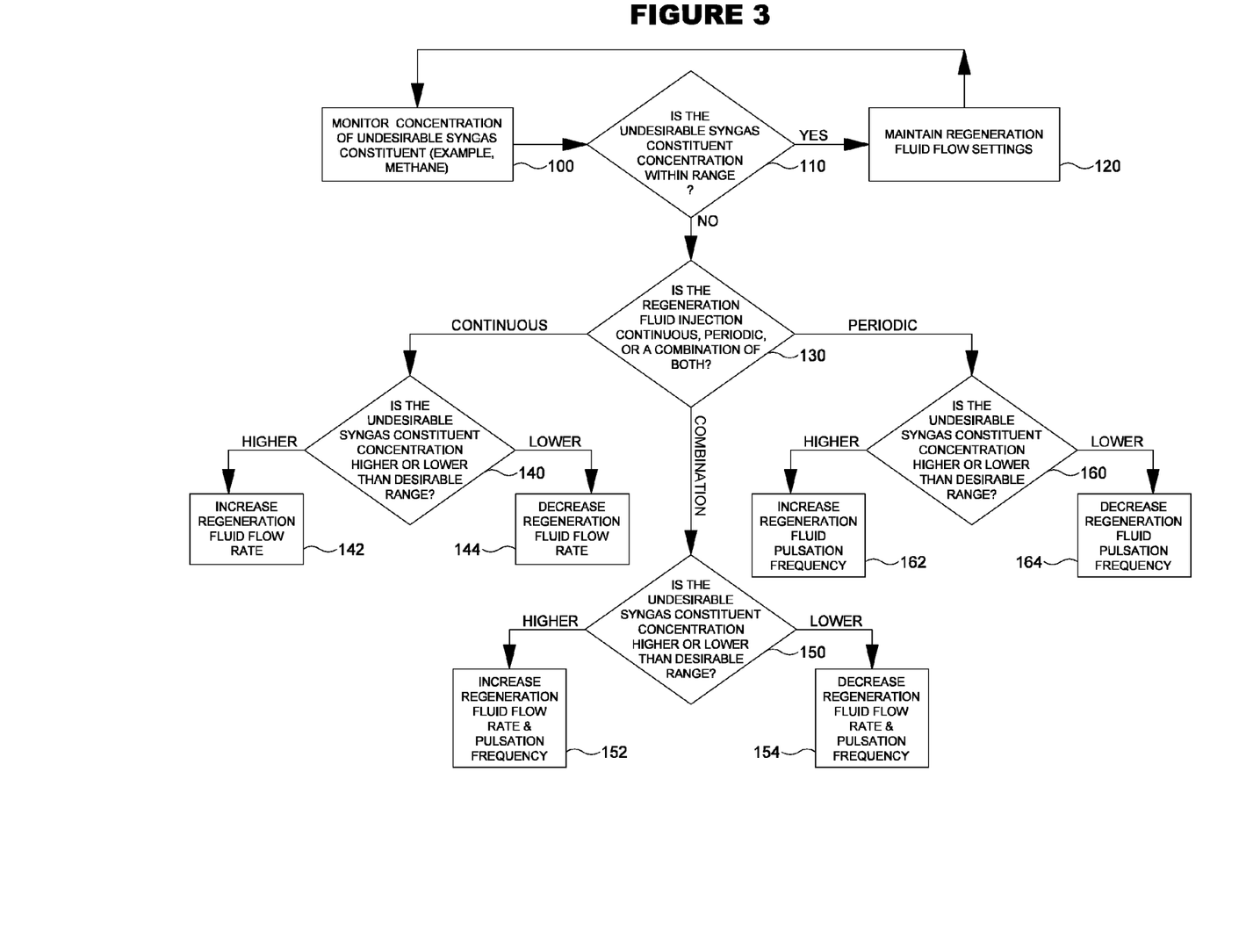
FIG. 3 shows a decision diagram for an embodiment of a method of catalytic element operation and control.

FIG. 3 presents a flow chart depicting one embodiment of the operation of the catalytic elements (04) to convert one or more undesirable syngas constituents into desirable syngas constituents while dynamically avoiding catalyst deactivation and pore plugging. Throughout the operation of the catalytic elements (04), the exit syngas concentration of at least one undesirable syngas constituent (for example, methane) is monitored; this is portrayed in Step 100 on FIG. 3.

Step 110 entails determining if the measured concentration of the undesirable syngas constituent is within a desirable or design range. For example, a gas chromatograph-type sensor may be used to monitor hydrocarbon concentration, including methane. If the measured concentration is within the desirable or design range (for example, say between 0.2% and 0.5% by volume range), the regeneration fluid settings are maintained as portrayed in Step 120. However, if the measured concentration is outside the desirable or design range, Step 130 will commence which entails determining the appropriate regeneration fluid flow scheme depending upon the formulator's preference.

If the formulator has specified that a continuous regeneration fluid flow scheme is desired, control flows to Step 140 to determine if the undesirable syngas concentration is higher or lower than the desirable or design range. If, in Step 140, it is determined that the undesirable syngas concentration is higher than the desirable or design range, then control flows to Step 142 which causes an increase in regeneration fluid flow rate. On the other hand, if in Step 140, it is determined that the undesirable syngas concentration is lower than the desirable or design range, then control flows to Step 144 which causes a decrease in regeneration fluid flow rate.

If the formulator has instead specified that a combined continuous and periodic regeneration fluid flow scheme is desired, control flows to Step 150 to determine if the undesirable syngas concentration is higher or lower than the desirable or design range. If, in Step 150, it is determined that the undesirable syngas concentration is higher than the desirable or design range, then control flows to Step 152 which causes an increase in regeneration fluid flow rate together with an increase in pulsation frequency. On the other hand, if in Step 150, it is determined that the undesirable syngas concentration is lower than the desirable or design range, then control flows to Step 154 which causes a decrease in regeneration fluid flow rate together with a decrease in pulsation frequency.

If the formulator has instead specified that a periodic regeneration fluid flow scheme is desired, then control flows to Step 160 to determine if the undesirable syngas concentration is higher or lower than the desirable or design range. If, in Step 160, it is determined that the undesirable syngas concentration is higher than the desirable or design range, then control flows to Step 162 which causes an increase in pulsation frequency. On the other hand, if in Step 160, it is determined that the undesirable syngas concentration is lower than the desirable or design range, then control flows to Step 164 which causes a decrease in pulsation frequency.

Figure 4:
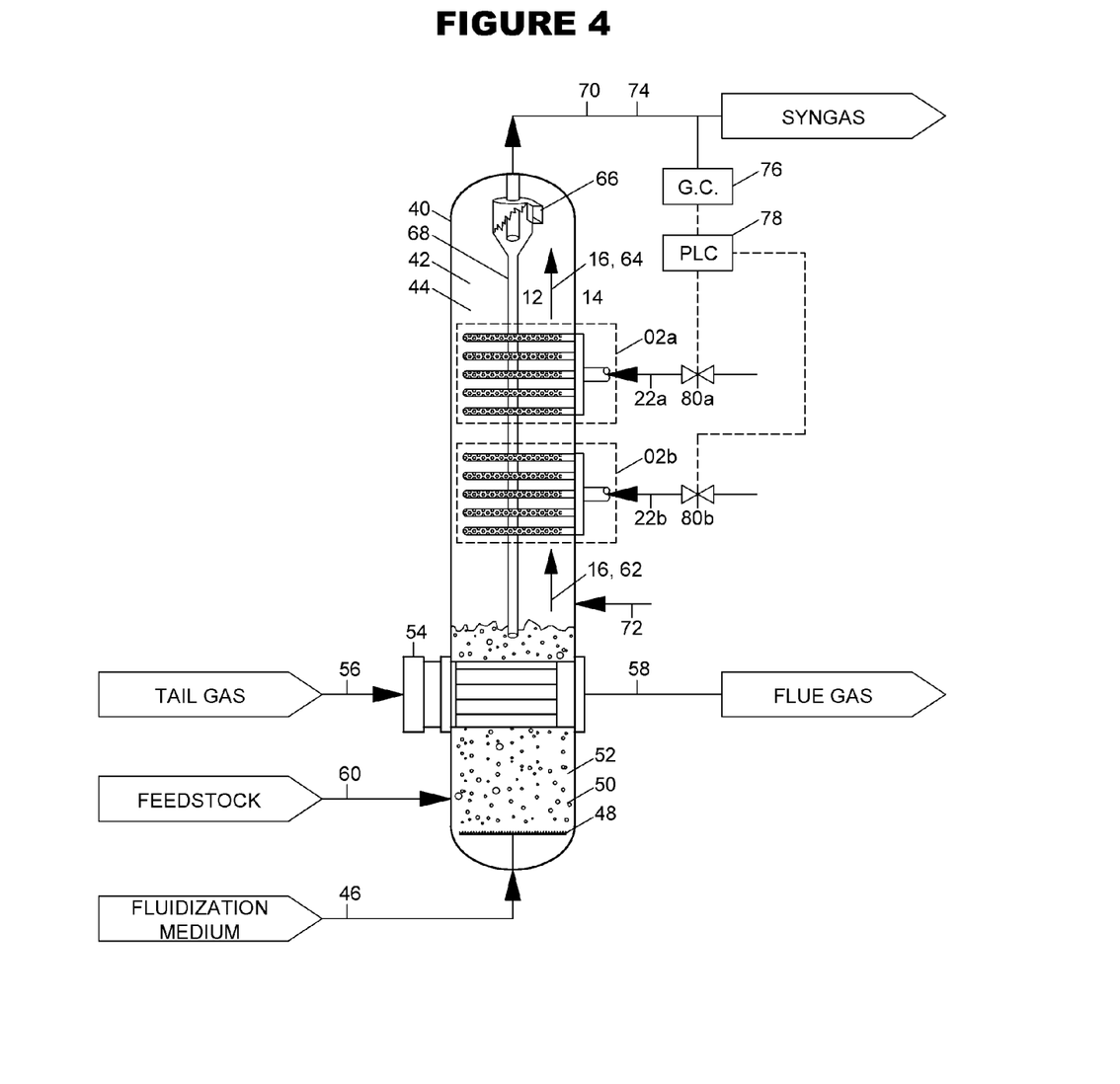
FIG. 4 shows a first embodiment of a system comprising a gasifier having integrated catalytic elements configured for in-situ catalyst regeneration.
Figure 5:
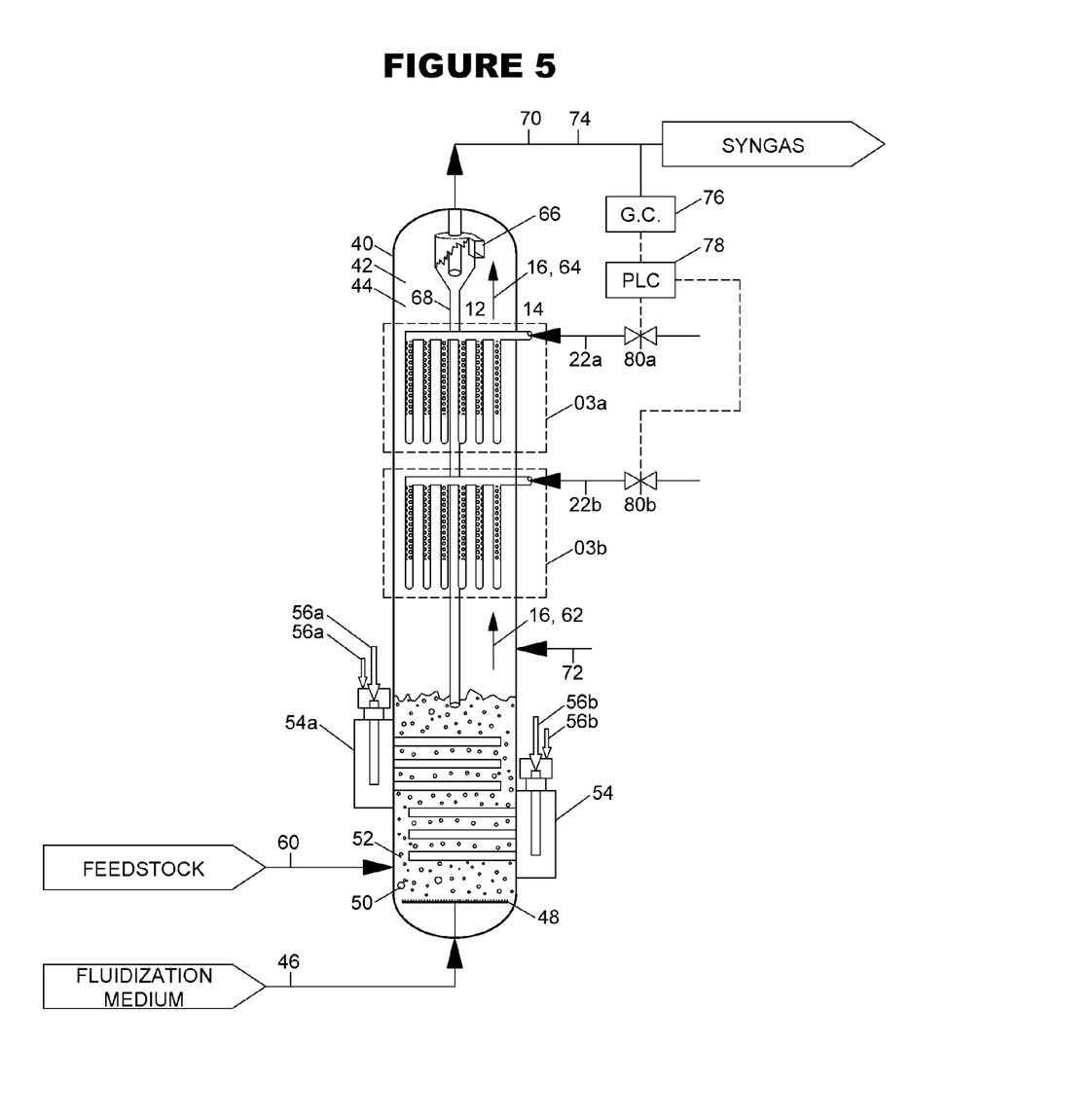
FIG. 5 shows a second embodiment of a system comprising a gasifier having integrated catalytic elements configured for in-situ catalyst regeneration.

As seen in FIGS. 4 and 5, multiple catalytic assembles (02a, 02b, 03a, 03b) may be employed. In such case, fewer than all assemblies may be regenerated at any given time. For example, the assemblies may be regenerated sequentially, each assembly being regenerated in a pulse mode.

An embodiment of the application of the above method is shown in FIG. 4 wherein the system includes an indirectly heated fluidized bed gasifier assembly (40) equipped with multiple catalytic element assemblies (02a & 02b) oriented horizontally within the freeboard region (42) of the gasifier vessel (44) and perpendicular to the predominant direction of syngas flow (16). Two catalytic element assemblies (02a & 02b) are shown for simplicity. However, it is contemplated that indirectly heated fluidized bed gasifier assemblies (40) will have multiple catalytic element assemblies (02a & 02b).

The indirectly heated fluidized bed gasifier assembly (40) shown in FIG. 4 contains a fluidization medium (46), such as steam, which is transferred through a distributor plate (48), and used to fluidize a bed material (50). Indirect heat may be transferred to the fluid bed (52) through at least one pulse combustion device (54) which accepts and combusts an appropriate fuel (56), such as tail gas, while outputting a hot flue gas (58). A feedstock or carbonaceous material (60) is introduced to the lower section of the gasifier vessel (44) and is converted into raw syngas (62) which passes up through the bed and is released into the freeboard region (42).

The raw syngas (62) will come into contact with the catalytic element assembly (02a & 02b) which will convert undesirable syngas constituents into desirable syngas constituents. An improved syngas (64) will exit the catalytic element assembly (02a & 02b) and continue traveling thorough the freeboard region (42) until it enters an internal cyclone (66) positioned within the freeboard region (42) and equipped to capture fine bed material (50), along with carbon particulate material, and return the collected solids to the bed via a cyclone dipleg (68). A particulate-depleted improved syngas (70) exits the indirectly heated fluidized bed gasifier assembly (40) for downstream processing.

In FIG. 4, each catalytic element assembly (02a & 02b) is oriented horizontally with syngas flowing up and across the catalytic elements. An alternate embodiment is shown in FIG. 5 wherein the catalytic element assemblies (03a & 03b) are oriented vertically with syngas flowing in parallel to and over the elements and oriented parallel to the predominant direction of syngas flow (16). In both cases, the elements are to be spaced closely to maximize gas-catalyst contact and operate at elevated local syngas velocity (3 to 50 ft/s) to ensure operation in the turbulent gas flow regime.

Both FIG. 4 and FIG. 5 display a standard PID control loop used to monitor and control the composition of the syngas of improved quality. A first sensor, such as a gas chromatograph sensor (76), acquires a syngas sample from the transfer conduit (74) and monitors the concentration of a particular syngas constituent, say methane. This information is provided to a first programmable logic controller (78) which, in response, sends appropriate signals to one or more control valves (80, 80a, is achieved in the preferred embodiment of FIGS. 4 and 5 in several ways. For example, syngas comprising propane ($C_3H_8$) is cracked into a compound containing a lesser amount of carbon atoms desired by the formulator, for example, methane ($CH_4$), carbon monoxide (CO), ethane ($C_2H_6$), ethylene ($C_2H_4$) and the like. Furthermore, in the presence of a suitable catalyst, steam can reform methane ($CH_4$) into carbon monoxide (CO) and hydrogen ($H_2$). Lastly, the presence of a suitable catalyst can decompose ammonia ($NH_3$) into nitrogen ($N_2$) and hydrogen ($H_2$).

As seen in FIGS. 4 and 5, the preferred location of a catalytic element assembly (02a, 02b, 03a, 03b) is the freeboard region (42). However, in other embodiments, the assembly may be located in the dense fluid bed (52) section of the gasifier vessel (44) if desired.

It is generally preferred that the catalytic element assembly (02a, 02b, 03a, 03) be positioned higher up in the freeboard region, i.e. above the splash or transition zone between dense fluidized bed and dilute phase region to reduce particle-catalyst surface contact. This also permits the introduction of an oxidant (72) (oxygen and steam, for example) in the splash zone to increase the syngas temperature as necessary for enhanced catalyst performance. For instance, catalytic cracking, reforming, partial oxidation and/or decomposition efficiency improves with operating temperature. If, for example, the dense bed of the gasifier operates at 775° C., it would be beneficial to increase the syngas temperature to 850° C. to achieve high conversion efficiency of hydrocarbons, VOC, SVOC or other contaminants. While the regeneration fluid introduced through the catalytic element assembly (02a, 02b, 03a, 03b) could help increase the syngas temperature close to the catalyst surface, the oxidant addition upstream of the catalytic element assembly (02a, 02b, 03a, 03b) will aid in increasing the bulk syngas temperature to the desired level for enhanced conversion of the undesirable syngas constituent.

In FIGS. 4 and 5, two catalytic element assemblies (02a, 02b or 03a, 03b) are shown; however, many or multiple such assemblies may be used consistent with the extent of undesirable syngas constituents present and the level of conversion desired for these constituents.

In yet another embodiment, the catalytic elements (04) could be located external to the gasifier vessel (44), or in the transfer conduit (74) that conveys particulate-depleted improved syngas (70) from the internal cyclone (66).

Figure 6:
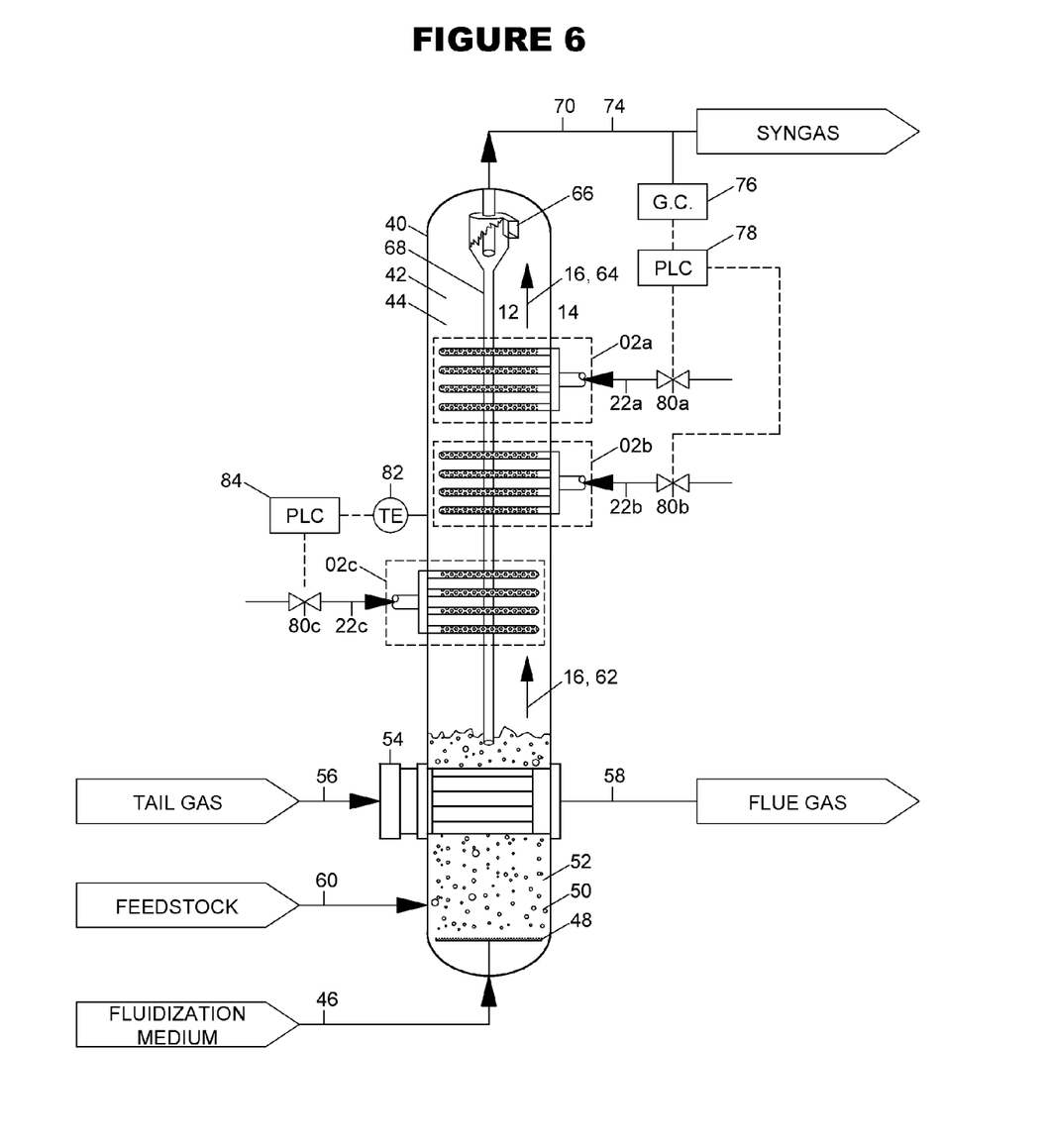
FIG. 6 shows a third embodiment of a system comprising a gasifier having integrated catalytic elements configured for in-situ catalyst regeneration.

FIG. 6 depicts yet another embodiment wherein a non-catalytic assembly (02*c*) is installed beneath two catalytic element assemblies (02*a*, 02*b*) in the vessel (44). The non-catalytic assembly (02*c*) may be structurally similar to catalytic element assemblies (02*a*, 02*b*), but lacks an active catalyst or optional sorbent on its surface. It is generally preferred that the non-catalytic assembly (02*c*) be positioned lower in the freeboard region, i.e., nearby the splash or transition zone just above the dense fluidized bed and dilute phase region, to increase surface contact between particles and second regeneration fluid (22*c*) diffusing through the porous walls of the non-catalytic assembly (02*c*). This also permits substantially uniform introduction of a second regeneration fluid (22*c*) (oxygen and steam, for example) across the lower section of the freeboard region to increase the syngas temperature, as needed, for enhanced catalyst performance in the two catalytic element assemblies (02*a*, 02*b*) located above the non-catalytic assembly (02*c*). Location of the non-catalytic assembly (02*c*) lower in the freeboard region also serves to shield the catalyst and optional sorbent surface (24) of the two catalytic element assemblies (02*a*, 02*b*) located above from potential erosion of impinging entrained particles.

Injection of the second regeneration fluid (22*c*) to the non-catalytic assembly (02*c*) is regulated with a standard PID control loop used to monitor and control the freeboard temperature between the non-catalytic assembly (02*c*) and the catalytic element assembly (02*b*) located immediately above it. A second sensor, such as a temperature element (82) monitors the freeboard temperature and this information is provided to a second programmable logic controller (84) which, in response, sends appropriate signals to one or more control valves (80*c*) used to regulate the amount of second regeneration fluid (22*c*) supplied to the non-catalytic assembly (02*c*) for optimal syngas quality improvement.

It is understood that while only one non-catalytic assembly (02*c*) is shown in FIG. 6, more than one non-catalytic assembly (02*c*) may be provided below any of the catalytic element assemblies (02*a*, 02*b*). It is further understood that while FIG. 6 depicts the non-catalytic assembly (02*c*) to have the same general shape as the first and second catalytic element assemblies (02*a*, 02*b*), the non-catalytic assembly (02*c*) may have other shapes instead.

The syngas may be pretreated to remove one or more syngas contaminants (e.g. HCl, metal vapors) by injecting one or more sorbents either into the gasifier or into the syngas upstream of the catalytic treatments cited above.

The invention described herein can have a great many applications. The method is particularly well suited to, and thus usable in, the catalysis of various reactions, such as, for example, ammonia synthesis, methanol synthesis, CO shift reaction, methanol oxidation to formaldehyde, ethylene to ethylene oxide, dehydration, hydrosulfurization, hydrodenitrification, desulfurization, hydrodesulfurization, dehydrohalogenation, reforming, steam reforming, cracking, hydrocracking, hydrogenation, dehydrogenation, isomerization, dismutation, oxychlorination, dehydrocyclization of hydrocarbons or other organic compounds, oxidation and/or reduction reactions, the Claus reaction, the treatment of exhaust gases from internal combustion engines, in particular in automobile afterburning and in particular three-way catalysis, demetallation, methanation, the shift conversion or the catalytic oxidation of the soot emitted by internal combustion engines, such as diesel engines or gasoline engines operating under lean burn conditions. Finally, the catalytic systems and the compositions of the invention can be used for the selective catalytic reduction of NOx by any reducing agent of the hydrocarbon type or also by ammonia or urea and for the hydrolysis or decomposition of urea to give ammonia.

In the case of these uses in catalysis, the compositions of the invention can be employed in combination with precious metals or also transition metals in the oxide, sulfide or other form and they thus act as support for these metals. The nature of these metals and the techniques for incorporating the latter in the support compositions are well known to a person skilled in the art. For example, the metals can be gold, silver, platinum, rhodium, palladium or iridium, molybdenum, tungsten, nickel, cobalt, manganese, copper, titanium, silicon or vanadium; they can be used alone or in combination and they can in particular be incorporated in the compositions by impregnation.

Example 1

In order to configure a satisfactory catalytic scheme for raw syngas processing, the following criteria were formulated:

The architecture should be amenable to in-situ regeneration with an oxidant containing fluid;

The catalyst should be active, contaminant tolerant and regenerable in the 1,000 to 1,275 K temperature range;

The catalyst should be insensitive to sulfidation, oxidation and chloridation and should be reversible to metal in case of compound formation;

The sorbent should be active and regenerable in the 1,000 to 1,275 K temperature range; and The support should be mechanically and structurally stable, contaminant tolerant and provide high strength, high specific surface area and good thermal resistance to coarsening and sintering in the 1,000 to 1,275 K temperature range.

The catalyst and sorbent should have melting point greater than 1,500 K and the support should have melting point greater than 1,775 K.

Based on a study and review of the Ellingham Diagrams for different compounds (sulfides, oxides, chlorides, sulfates, etc.), the following observations were made:

Noble metals such as Ir, Pt, Pd, Rh and Re are potential catalyst candidates; Ni and Ru may be used as catalyst if the raw gas or raw syngas does not have contaminants or has been pre-treated for contaminants.

Copper oxide or Cu—Cr—O oxides, W and Mo are potential sorbent candidates;

Monoclinic or stabilized or doped zirconia and alkali-earth hexaaluminates are potential support candidates; Ceria, alumina, zirconia, yittria, lanthanum, magnesium aluminate, promoted alumina, silica, titania, etc. may be used as support if the raw gas or raw syngas does not have contaminants or has been pre-treated for contaminants, and Perovskites such as $ADO_3$ may be used as catalyst and optional sorbent combination wherein A may correspond to one or more of La, Zr, Y, Mg, Gd, Sr and Ti and D may include one or more of copper oxide, Cu—Cr—O, Fe, Co, W, Mo, Ir, Pt, Pd, Rh and Re; if the raw gas or raw syngas does not have contaminants or has been pre-treated for contaminants, A may include one or more of La, Sr, Ca, Mg, Si, Ce, Zr, Ti, Ba, etc. and D may include Ni, Ru, Fe, Co, Al, Mn, Rh, Cu, etc.

Although the present invention has been described with reference to certain embodiments, it should be understood that various alterations and modifications could be made without departing from the spirit or scope of the invention as hereinafter claimed.

TABLE OF REFERENCE NUMERALS catalytic element assembly (02, 02a, 02b)
catalytic element assembly (03, 03a, 03b)
non-catalytic assembly (02c)
catalytic elements (04)
catalytic element manifold (06)
elongated hollow tube (08)
closed second end (10)
syngas flow path (12)
bounding region external to the gasifier (14)
predominant direction of syngas flow (16)
porous portion (18)
non-porous portion (20)
regeneration fluid (22, 22a, 22b, 22c)
active catalyst and optional sorbent surface (24)
entire length of the catalytic element (26)
leading edge portion (28)
regeneration fluid inlet port (30)
external walls (32)
manifold portion (34)
catalytic element exterior wall (36)
catalyst and optional sorbent (38)
indirectly heated fluidized bed gasifier assembly (40)
freeboard region (42)
gasifier vessel (44)
fluidization medium (46)
distributor plate (48)
bed material (50)
fluid bed (52)
pulse combustion device (54, 54a)
fuel (56, 56a, 56b)
flue gas (58)
carbonaceous material (60)
raw syngas (62)
improved syngas (64)
internal cyclone (66)
cyclone dipleg (68)
particulate-depleted syngas of improved quality (70)
transfer conduit (72)
transfer conduit (74)
gas chromatograph (76)
programmable logic controller (78, 84)
control valve (80, 80a, 80b, 80c)
temperature element (82)
Step 100 (monitor undesirable syngas concentration)
Step 110 (determine if concentration is within range)
Step 120 (maintain regeneration fluid flow settings)
Step 130 (determine regeneration fluid flow scheme)
Step 140 (if continuous flow scheme, is the undesirable syngas concentration higher or lower than range)
Step 142 (if higher, increase regeneration fluid flow rate)
Step 144 (if lower, decrease regeneration fluid flow rate)
Step 150 (if combination flow scheme, is the undesirable syngas concentration higher or lower than range)
Step 152 (if higher, increase regeneration fluid flow rate & increase pulsation frequency)
Step 154 (if lower, decrease regeneration fluid flow rate & decrease pulsation frequency)
Step 160 (if periodic flow scheme, is the undesirable syngas concentration higher or lower than range)
Step 162 (if higher, increase pulsation frequency)
Step 164 (if lower, decrease pulsation frequency)

What is claimed is:

1. A system for processing a raw syngas comprising:
a gasifier configured to accommodate a raw syngas to be processed; and
one or more catalytic elements positioned in the vessel such that a catalyst associated with the catalytic element contacts the raw syngas to thereby produce an improved syngas, the catalytic element being connected to a source of regeneration fluid,
wherein each catalytic element comprises a metal or ceramic structure having:
porous walls configured to allow the regeneration fluid to pass therethrough;
at least one catalyst supported on an external surface thereof; and
one or more internal channels suitable for delivery of the regeneration fluid through the porous walls to regenerate the at least one catalyst; and
wherein the raw syngas contacts the at least one catalyst supported on the external surface of the catalytic element, as the raw syngas flows past the catalytic element within the vessel.

2. The system according to claim 1, wherein:
the gasifier includes a contact region where a plurality of catalytic elements contact the raw syngas;
the plurality of catalytic elements occupy 10 to 60% of the contact region by volume; and
a footprint of the catalytic elements occupies 50 to 95% of a cross-section of the contact region.

3. The system according to claim 1, comprising a plurality of catalytic elements organized into one or more catalytic element assemblies, each catalytic element assembly comprising:
a catalytic element manifold;
at least one inlet connected to the catalytic element manifold; and
the plurality of catalytic elements connected to the catalytic element manifold.

4. The system according to claim 3, wherein:
each catalytic element comprises an elongated tube connected to the catalytic element manifold;
each catalytic element has a first end and a second end;
each catalytic element is connected at its first end to the catalytic element manifold; and
the plurality of catalytic elements are arranged in staggered rows and extend in a common direction from the catalytic element manifold.

5. The system according to claim 3, comprising:
first and second catalytic element assemblies spaced apart from one another within the vessel;
a first controller configured to control supply of a first regeneration fluid to the first and second catalytic elements, in response, at least in part, to information from a first sensor;
at least one non-catalytic assembly located below the first and second catalytic element assemblies; and
a second controller configured to control supply of a second regeneration fluid to the at least one non-catalytic assembly in response, at least in part, to information from a second sensor.

6. The system according to claim 1, wherein:
the raw syngas includes one or more undesirable syngas constituents;
and the one or more undesirable syngas constituents are subject to one or more of the group consisting of catalytic cracking, reforming, partial oxidation and decomposition, to promote their conversion into desirable syngas constituents to form the improved syngas.

7. The system according to claim 6, wherein:
the gasifier has a freeboard region;
a plurality of catalytic elements are positioned in the freeboard region of the gasifier;
the plurality of catalytic elements occupy 10 to 60% of the volume of the freeboard region; and
a footprint of the catalytic elements occupies 50 to 95% of a cross-section of the freeboard region where the catalytic elements are present.

8. The system according to claim 1, wherein:
the regeneration fluid comprises a mixture including one or more of the group consisting of steam, oxygen, air and carbon dioxide;
the regeneration fluid comprises reactants to facilitate in-situ regeneration of the catalyst utilizing one or more steps from the group consisting of partial oxidation and reforming.

9. The system according to claim 8, wherein:
the external surface of each catalytic element also accommodates a sorbent; and
the regeneration fluid further comprises reactants to facilitate in-situ regeneration of the sorbent by desorption or oxidation.

10. The system according to claim 1, configured to supply regeneration fluid having:
a steady flow component; and
a superimposed pulsating flow component supplied at a pulsing frequency ranging from 0.001 Hz to 100 Hz.

11. The system according to claim 1, wherein:
each catalytic element comprises one or more pore-forming agents added to the catalyst and the optional sorbent to render the catalyst and the optional sorbent layer porous.

12. The system according to claim 1, comprising one or more perovskites of the general formula $ADO_3$ supported on the external surface, wherein:
A is one or more from the group consisting of La, Zr, Y, Mg, Gd, Sr and Ti, and
D is one or more from the group consisting of copper oxide, Cu—Cr—O, Fe, Co, W, Mo, Ir, Pt, Pd, Rh and Re.

13. The system according to claim 1, wherein:
the raw syngas contains contaminants;
and each catalytic element comprises:
a tube formed from one or more materials selected from the group consisting of monoclinic zirconia, yittria stabilized zirconia (YSZ), gadolinium-doped zirconia (Gd—Z) and alkaline-earth metal hexa-aluminate; and
a coating comprising:
one or more catalyst metals selected from the group consisting of Rh, Pt, Ir, Pd and Re, and
one or more sorbents selected from the group consisting of copper oxide, Cu—Cr—O oxides, W and Mo.

14. The system according to claim 1, wherein the external surface of each catalytic element comprises:
a first layer formed from one or more of the group consisting of monoclinic zirconia, YSZ, Gd—Z, alkaline-earth metal hexa-aluminate, and
a second layer comprising one or more metals selected from the group consisting of Rh, Pt, Ir, Pd, Re, copper oxide, Cu—Cr—O oxides, W and Mo.

15. The system according to claim 14, wherein each catalytic element comprises a nickel-chromium-iron-molybdenum alloy tube.

16. The system according to claim 1, comprising one or more perovskites of the general formula $ADO_3$ supported on the external surface, wherein:
A is one or more from the group consisting of La, Sr, Ca, Mg, Si, Ce, Zr, Ti and Ba; and
D is one or more from the group consisting of Ni, Ru, Fe, Co, Al, Mn, Rh, and Cu.

17. The system according to claim 1, wherein:
each catalytic element comprises:
a tube formed from one or more materials selected from the group consisting of ceria, alumina, zirconia, yittria, lanthanum, magnesium aluminate, promoted alumina, silica and titania, and
a coating comprising one or more catalyst metals selected from the group consisting of Ni and Ru.

18. The system according to claim 1, wherein the external surface of each catalytic element comprises:
a first layer formed from one or more of the group consisting of ceria, alumina, zirconia, yittria, lanthanum, magnesium aluminate, promoted alumina, silica and titania, and
a second layer comprising one or more metals selected from the group consisting of Ni, Ru.

19. The system according to claim 18, wherein each catalytic element comprises a nickel-chromium-iron-molybdenum alloy tube.

20. The system according to claim 1, wherein the at least one catalytic element has pores having a maximum cross-sectional dimension of between 0.05 and 10 microns.

21. A method of processing raw syngas comprising:
providing the system of claim 1;
contacting raw syngas with the plurality of catalytic element of the catalytic element assembly to form an improved syngas;
detecting at least one component of the improved syngas; and
controlling supply of a regeneration fluid to the catalytic element assembly based, at least in part, on a detected amount of the at least one component.

* * * * *